April 3, 1962   R. A. ECKERSALL   3,028,023
SYSTEM OF HANDLING FREIGHT
Filed April 2, 1958   5 Sheets-Sheet 1
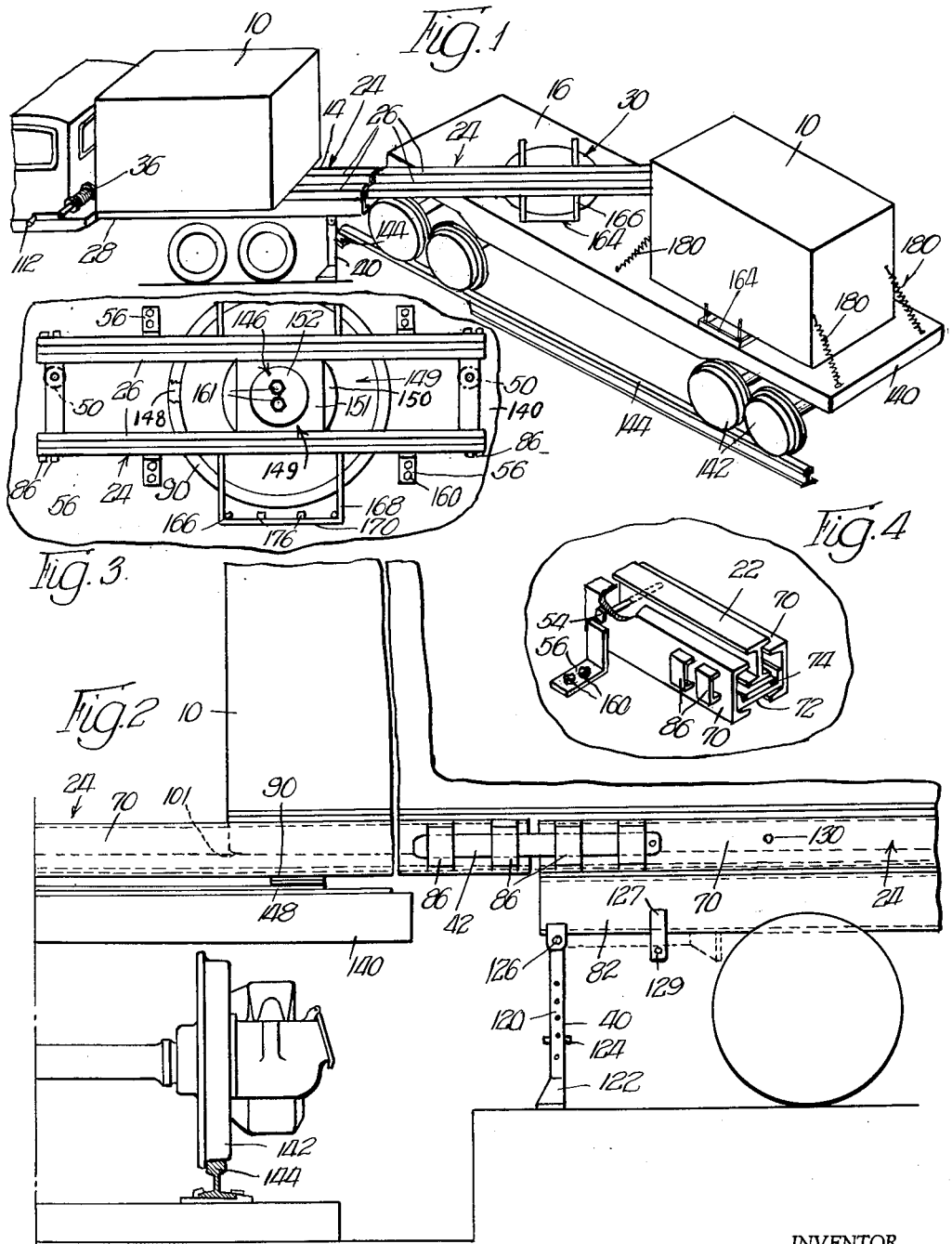
INVENTOR.
Raymond A. Eckersall,
BY
Mann, Brown + McWilliams
Attys

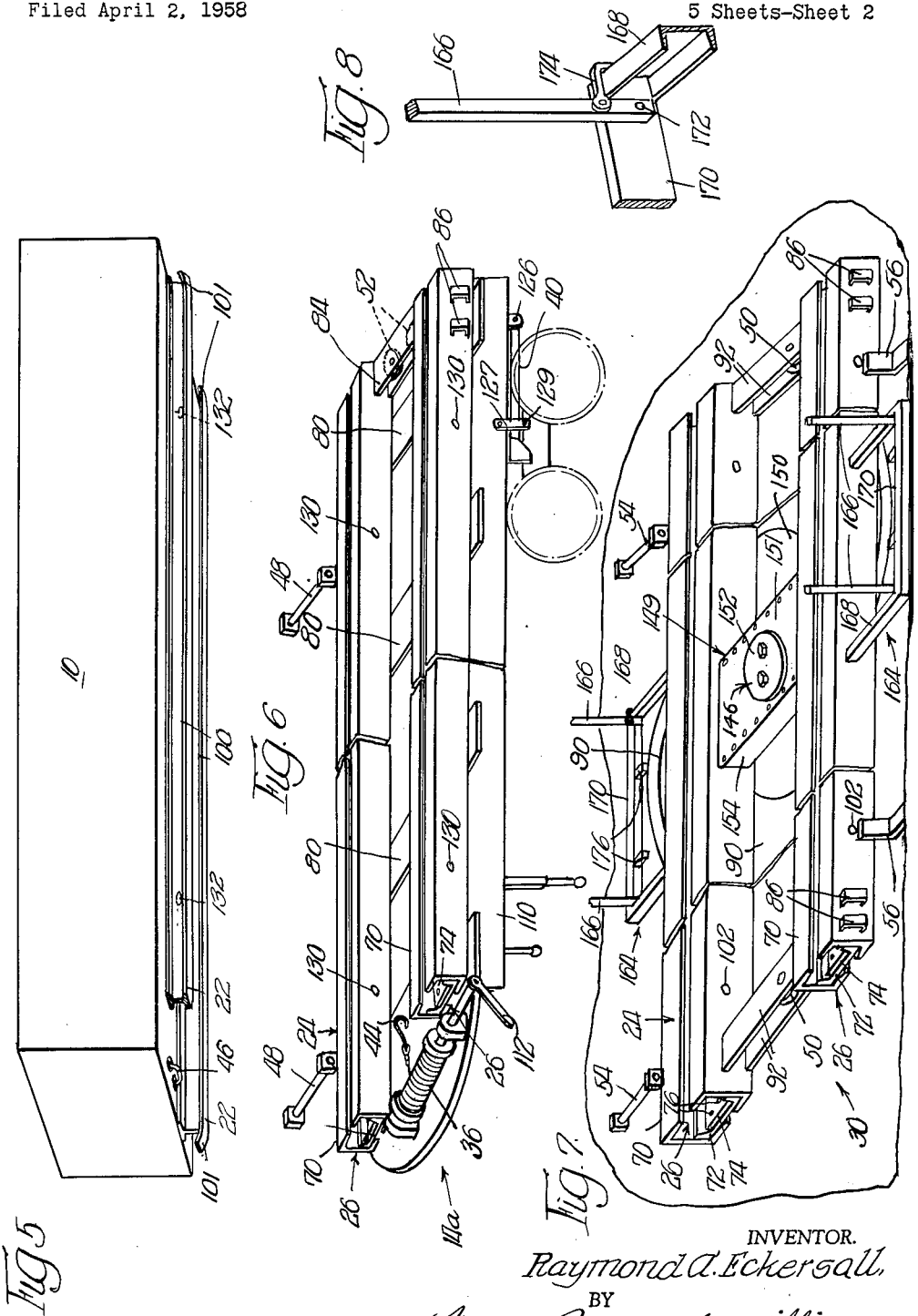

April 3, 1962  R. A. ECKERSALL  3,028,023
SYSTEM OF HANDLING FREIGHT
Filed April 2, 1958  5 Sheets-Sheet 3
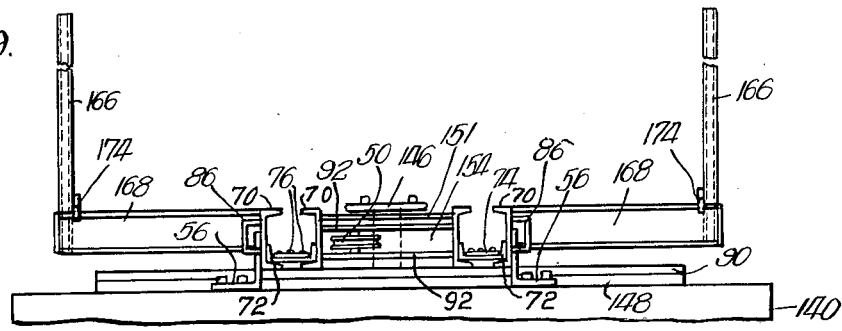
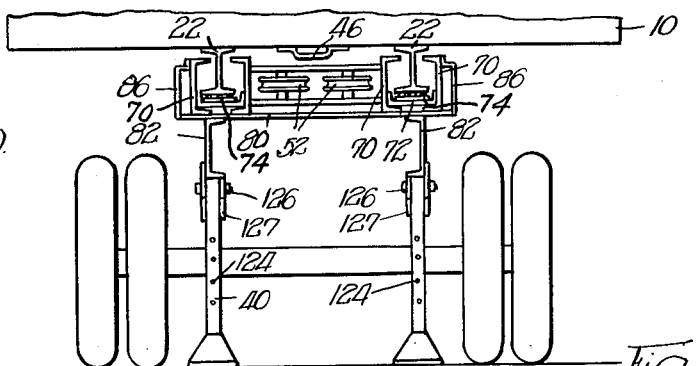
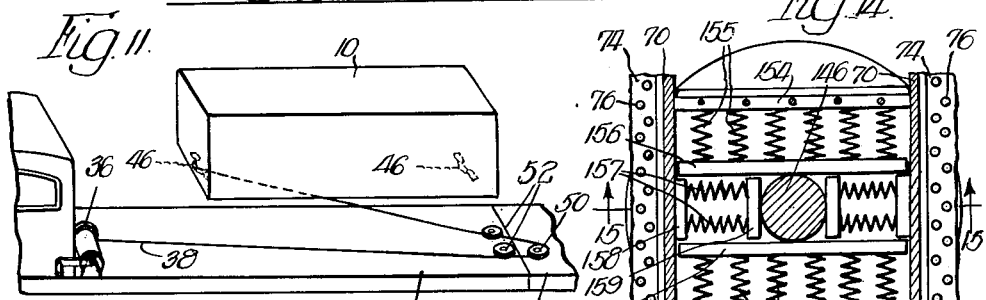
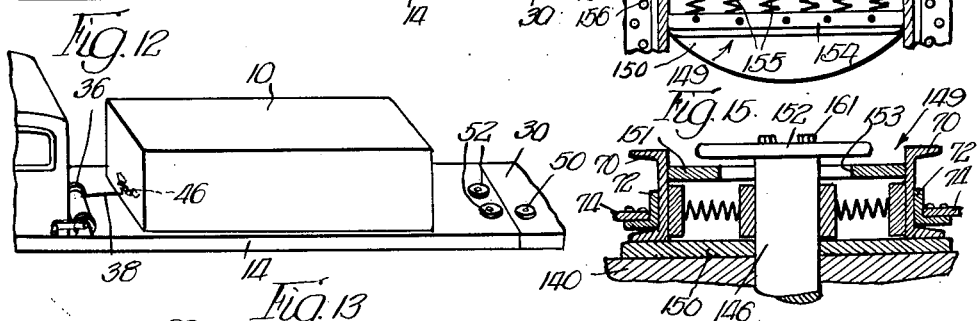
INVENTOR.
Raymond A. Eckersall,
BY
Mann, Brown + McWilliams

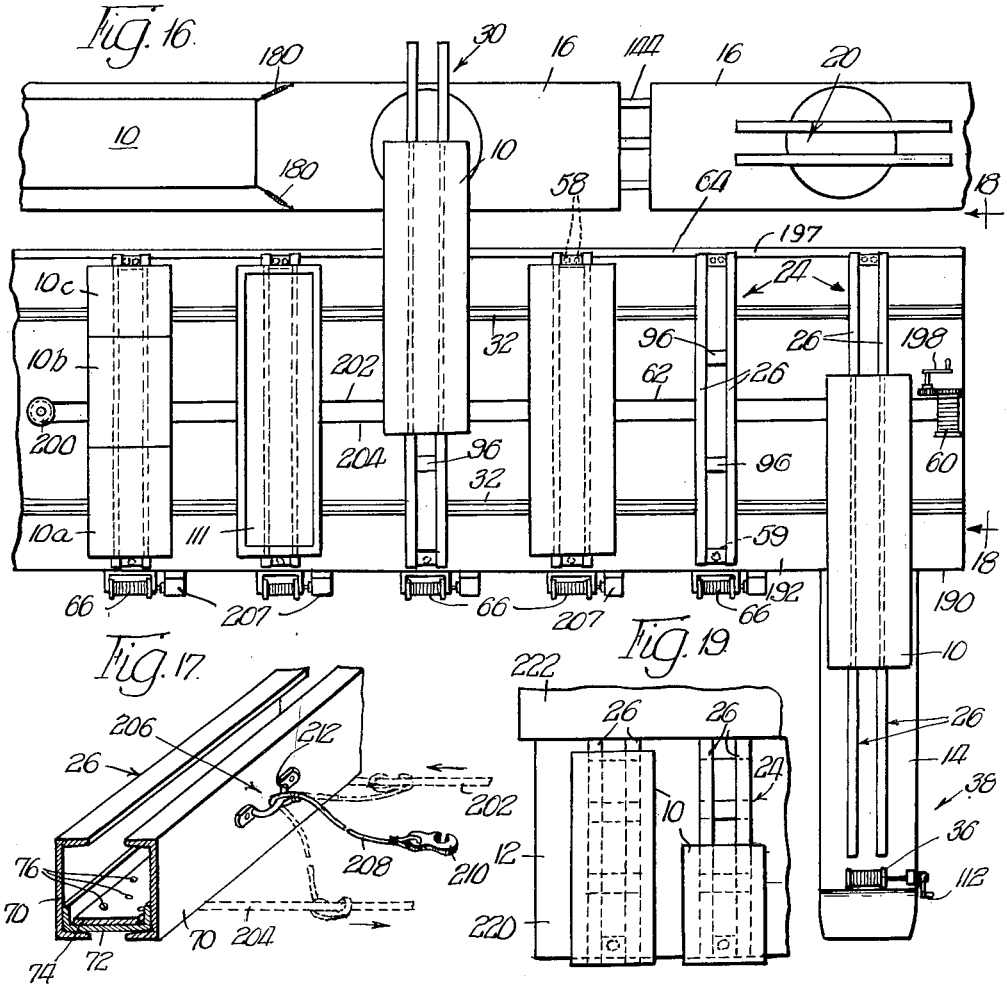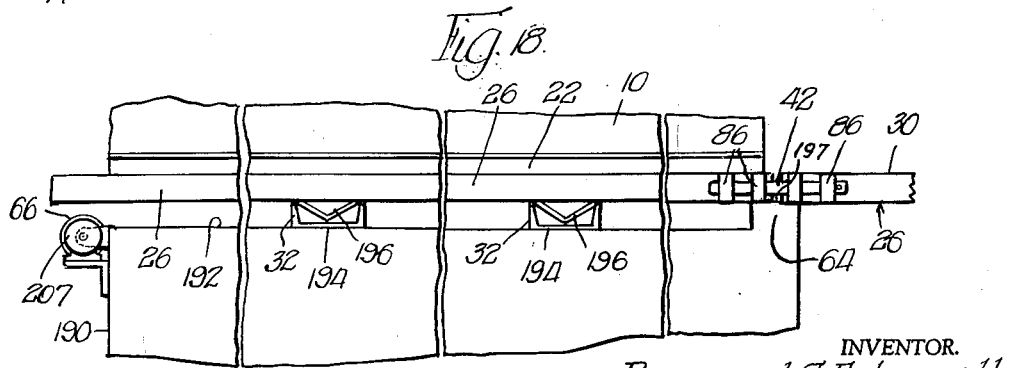

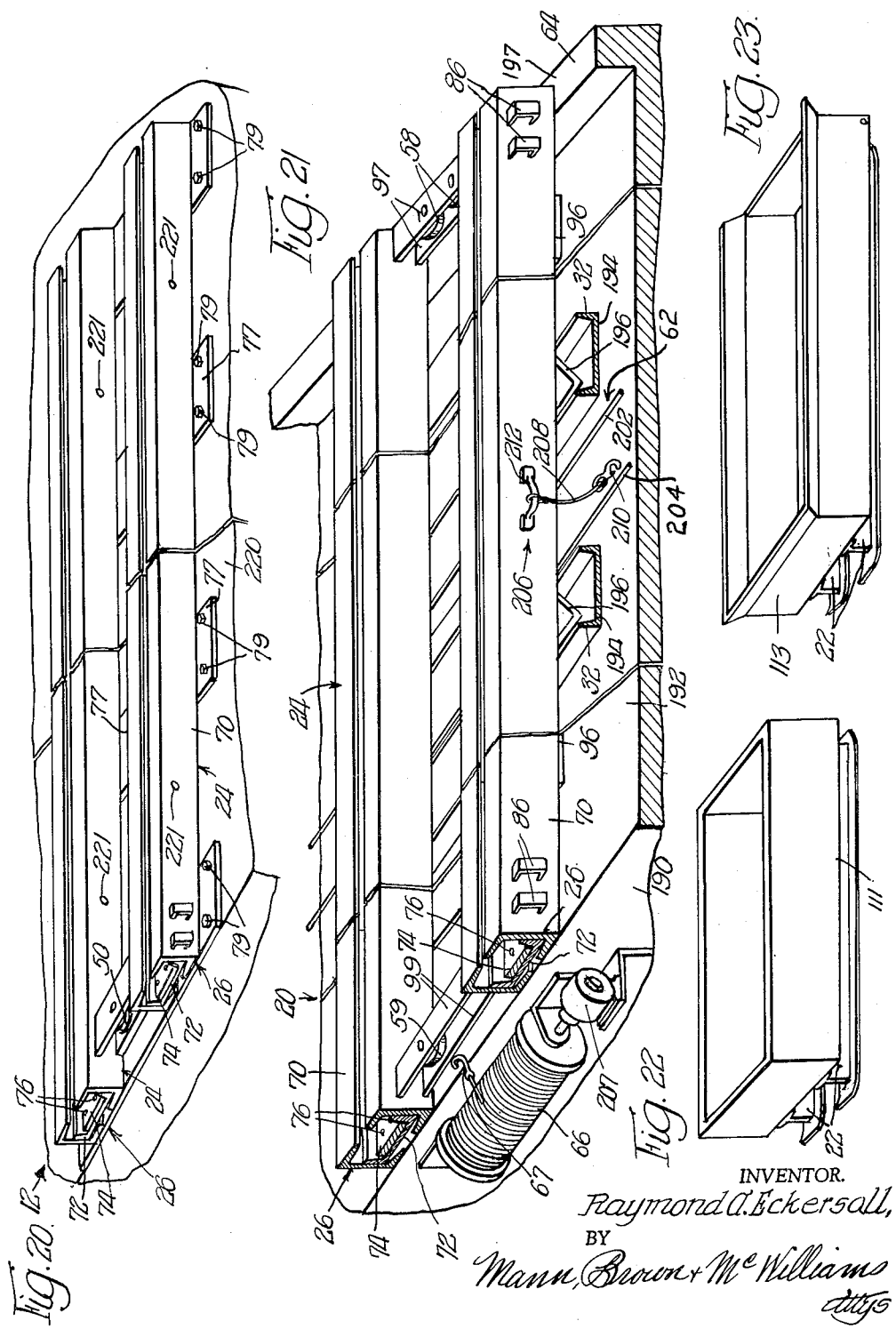

United States Patent Office 3,028,023
Patented Apr. 3, 1962

3,028,023
SYSTEM OF HANDLING FREIGHT
Raymond A. Eckersall, 1636 Rascher Ave., Chicago, Ill.
Filed Apr. 2, 1958, Ser. No. 725,968
6 Claims. (Cl. 214—38)

My invention relates to a system of handling freight, and more particularly, to a system including improved methods and apparatus for transporting freight in containers of various types and transferring them in a simple manner to and from loading docks, highway trucks and railroad cars.

The concept of transporting freight from place to place in containers has wide appeal to the railroad industry, but to date, it has not been widely accepted for a number of reasons, an important one being that substantial investments in new equipment normally are required. Most systems suggested heretofore have required that radically new equipment be purchased or that present facilities had to be completely revised, both of which the railroads are reluctant to accept. In some instances, new types of railroad cars and highway vehicles have been proposed which require extensive designing and testing to fully develop, while in other cases, cranes or lift trucks of large capacity are required to adopt a proposed system to conventional facilities.

A principal object of my invention is to provide a system of handling freight which requires only minor changes in existing facilities and which avoids any lifting of the freight container.

Another principal object of the invention is to simplify loading and unloading procedures and in general to speed up shipping time by eliminating many of the causes for delay.

A further important object of the invention is to provide a freight handling system that avoids all necessity for unnecessarily tieing up railroad or highway vehicle equipment.

Still a further object of the invention is to provide an improved method of handling freight that achieves substantial economies over existing methods.

Yet a further object of the invention is to provide apparatus for handling freight which is economical of manufacture, convenient in use, and which may be applied to most existing facilities suitable for the purposes.

Other objects, uses and advantages will be obvious or become apparent from a consideration of the following detailed description and the application drawings.

In the drawings:

FIGURE 1 is a diagrammatic perspective view illustrating a railroad car and a highway vehicle embodying the principles of my invention and shown positioned for transferring a freight container from the highway vehicle to the railroad car;

FIGURE 2 is a diagrammatic elevational view illustrating the manner in which the highway vehicle chassis and the railroad car are juxtaposed for transfer of the freight container between the two;

FIGURE 3 is a diagrammatic plan view illustrating a railroad car turntable structure that, in accordance with my invention, is employed on a railroad car in the manner diagrammatically illustrated in FIGURE 1;

FIGURE 4 is a fragmental perspective view illustrating the manner in which the freight container is secured to the turntable structure, as well as the manner in which the turntable structure is fixed against rotating movement with respect to the railroad car while the container is being transported on the car;

FIGURE 5 is a diagrammatic perspective view illustrating one form of freight container that may be employed in accordance with the principles of my invention;

FIGURE 6 is a diagrammatic perspective view of a semi-trailer chassis arranged in accordance with the principles of my invention;

FIGURE 7 is a diagrammatic perspective view of the railroad car turntable structure shown in FIGURES 1 and 3;

FIGURE 8 is a fragmental diagrammatic perspective view of one of the alignment bars that are provided on the railroad car turntable structure for purposes of enabling the operator of the highway vehicle to properly align the container supporting chassis with the railroad car turntable when it is desired to transfer a container between the two;

FIGURE 9 is an end elevational view of the turntable structure shown in FIGURE 7;

FIGURE 10 is a rear end elevational view of a highway vehicle chassis and its container load as arranged in accordance with the principles of my invention;

FIGURE 11 diagrammatically illustrates the manner in which the freight container is slid, for instance, from the highway vehicle chassis to the railroad car turntable structure, the slider beds being shown in block form, and the container displaced upwardly somewhat from the highway vehicle, for clarity of illustration;

FIGURE 12 is a diagrammatic perspective view illustrating the manner in which the freight container is slid, for instance, from the railroad car turntable structure to the highway vehicle chassis, the slider beds and beams being shown in block form for clarity of illustration;

FIGURE 13 is a view similar to that of FIGURE 10, but in section and illustrating a modified form of slider bed;

FIGURE 14 is a diagrammatic horizontal sectional view through the turntable cushioning device illustrated in FIGURE 3;

FIGURE 15 is a diagrammatic sectional view along line 15—15 of FIGURE 14;

FIGURE 16 is a diagrammatic plan view illustrating a freight container gathering station arranged in accordance with the principles of my invention;

FIGURE 17 is a diagrammatic fragmental perspective view illustrating the manner in which the slider beds or the gathering station of FIGURE 16 may be moved into alignment with the turntable structures of railroad cars that are positioned alongside the gathering station;

FIGURE 18 is a diagrammatic side elevational view along line 18—18 of FIGURE 16, parts being broken away;

FIGURE 19 is a fragmental plan view illustrating a loading and unloading platform that may be employed at a customer's plant in accordance with the principles of my invention;

FIGURE 20 is a diagrammatic perspective view of one of the slider beds that is applied to the platform of FIGURE 19;

FIGURE 21 is a diagrammatic cross-sectional view of a slider bed platform that is applied to the gathering station of FIGURE 16, together with a portion of said station;

FIGURE 22 is a diagrammatic perspective view of a gondola car like container adapted for use in accordance with the principles of my invention; and FIGURE 23 is a diagrammatic perspective view of a pickup truck body that is arranged in accordance with my invention for removal when the vehicle chassis is to be used to transport sealed containers of the types shown in other figures of the drawings.

*General Description*

Referring now more specifically to the drawings in which like references indicate like parts throughout the several views, my freight handling system contemplates the use of containers 10 (see FIGURE 1) in which the freight is loaded, which may be sealed in any appropriate manner, and which are transported from the customer's loading and unloading platform 12 (see FIGURE 19) located at the customer's plant by a highway vehicle 14 (see FIGURE 1) or 14a (see FIGURE 6), for instance, to a railroad car 16. The container 10 is then transferred to the railroad car 16, which in turn transports the container to, for instance, the shipping yard nearest the container's destination, at which point the container may be transferred to a highway vehicle 14 or 14a which transports the container to, for instance, a customer's loading and unloading platform 12.

Instead of transporting the containers 10 directly to or from the railroad car, the containers may be transported to a gathering station of the type generally indicated at 20 in FIGURE 16, on which the containers may be stored in readiness for transfer to either railroad cars or highway vehicles when they are made available to the gathering station. Furthermore, the containers may be transported directly to stores or to any series of local stops for unloading of portions of the load, and then further transported to other stops to complete unloading; the containers may also be loaded in this manner.

In accordance with my invention, each container is provided with a plurality of spaced skid beams 22 (see FIGURE 5) that extend longitudinally of the bottom of the container. The beams 22 may be of any suitable design and preferably are two in number as indicated in the drawings. The beams slidably engage a slider bed structure 24 that, in accordance with my invention, is employed on the highway vehicle 14, the railroad car 16, the gathering station 20 and the customer's loading and unloading platform 12. The slider bed structure generally comprises a pair of guideways 26 (see FIGURES 6, 7, 20 and 21) which are spaced to receive beams 22 of the containers.

In the case of the chassis 28 of the highway vehicle 14 or chassis 110 of vehicle 14a, the guideways 26 are mounted on top of the chassis in the manner diagrammatically illustrated in FIGURES 6 and 10.

In the case of the railroad car 16, the guideways 26 form a part of turntable devices 30.

In the case of the customer's loading and unloading platform 12, the guideways 26 are fixed directly to the platform at the desired distance above the ground.

In the case of the gathering station 20, the pairs of guideways 26 are slidably mounted on suitable tracks 32 that extend longitudinally of the railroad track, and means is provided for separately moving the pairs of guideways longitudinally of the track for alignment with the turntable structures 30 of individual railroad cars that are positioned at the station for loading or unloading. This avoids the need for precisely positioning cars 16 with respect to the slider beds of station 20.

As best shown in FIGURES 6, 11 and 12, the highway vehicle in accordance with my invention is provided with a winch 36 on which a cable 38 is wound for use in moving the container between the highway vehicle, and the railroad car or the gathering station 20, of the loading and unloading platform 12.

In operation, a highway vehicle, which may be either in the form of a truck as illustrated in FIGURE 1 or a semitrailer including a trailer of the type shown in FIGURE 6, is backed up to a slider bed 24 that is applied to the customer's loading and unloading platform 12. The slider beds 24 of the highway vehicle and the loading platform 12 are aligned vertically by employing an appropriate ramp for the highway vehicle or constructing platform 12 at the desired elevation or both. After the highway vehicle operator has lined up the guideways 26 of his vehicle with the guideways of the platform 12, adjustable props 40 (see FIGURE 2) carried by the chassis are dropped in position to embrace the vehicle against sag during transfer of the container between the platform 12 and the vehicle. In addition, latch bars 42 secure the juxtaposed ends of the two slider beds in alignment. The cable 38 of the vehicle, which may be provided with an appropriate hook 44 at its end, is then extended to engage a front bracket 46 (see FIGURE 5) that is secured to the bottom of the container, and on actuation of the winch 36 to wind up the cable, the container 10 is drawn onto the highway vehicle in the manner indicated in FIGURE 12.

After the container is secured to the highway vehicle slider bed, as by appropriate bolts 48 (see FIGURE 6) passing through the beams 22 of the container and the guideways, the highway vehicle then may be actuated to transport the container 10 to a railroad car 16, which in the embodiment of FIGURE 1 is provided with several turntable structures 30. To transfer the container 10 to a turntable structure 30, the highway vehicle chassis is aligned with the slider bed of the turntable structure in the manner indicated in FIGURE 1 and described above in connection with the customer's loading and unloading platform 12, props 40 being dropped into position and latch bars 42 being applied between the two slider beds as described above and as shown in FIGURE 2. It is contemplated that the cable 38 may be employed to turn the turntable structure to the position desired, as by pulling cable 38 between chassis pulleys 52 and hooking the cable onto one of the brackets 86 at the near end of the turntable slider bed, and winding up the cable on drum 36 as is necessary to move the turntable to approximately the position desired. After the props 40 and latch bars 42 have been put in place and the bolts 48 removed, the cable 38 is trained about a pulley 50 (see FIGURE 7) that is carried by the adjacent end of the turntable structure and then brought forwardly and attached to the bracket 46 at the forward end of the container in the manner diagrammatically illustrated in FIGURE 11. The winch 36 is then wound up to draw in the cable, which effects movement of the container onto the slider bed of the turntable structure 30. Use of the turntable structure pulley 50 insures that the container 10 will be slid completely onto the turntable structure; pulleys 52 carried by the slider bed of the highway vehicle may be used also, but this will require that the sliding action of the container be completed by the operator or handlers that are employed for this purpose.

After the container is positioned on the turntable structure, the cable 38 may be employed to turn the turntable structure so that the container is lined up with the railroad car 16. This is done by hooking the cable 38 onto a bracket 86 at the far end of the turntable structure. The container is fixed to the slider bed of the turntable structure by appropriate bolts 54 (see FIGURE 7), the turntable structure being restrained from turning movement by appropriate brackets 56 bolted to the floor of the railroad car 16 at each end thereof.

The railroad car 16 is then transported in the usual manner to its destination, at which point the container may be unloaded in much the same manner that the container was removed from the customer's loading and unloading platform 12, cable 38 being employed to turn the turntable, after brackets 56 have been removed, to its desired position with respect to a highway vehicle 14 or 14a and to draw the container onto the vehicle from the railroad car in the manner indicated in FIGURE 12. The highway vehicle 14 or 14a may then transport the container to a loading and unloading platform 12 at the container's destination and secure transfer of the container between the highway vehicle and a slider bed 24 positioned on the platform 12 in much the same manner that the container 10 is loaded on the railroad car.

Instead of conveying the containers directly between the railroad cars and the customer's plant or other final destination, the containers may be brought to a gathering station such as that illustrated at 20 (see FIGURE 16). The slider beds 24 of the gathering station 20 each employ guideways 26 joined together in any suitable manner to form a slider bed construction that is complementary to the container beams 22; the slider beds 24 of the gathering station each include pulleys 58, similar to pulleys 52, at the railroad car end thereof and a pulley 59 at the highway vehicle end thereof, similar to pulley 50 for cooperation with a cable in maneuvering the containers and the railroad car turntables.

A container 10 may be transferred to a gathering station slider bed 24 from a highway vehicle in the same manner that the container is transferred to the railroad car turntable structure, highway vehicle cable 38 being employed together with pulley 59 to move the container in the manner indicated in FIGURE 11. Alternately, a winch 66, fixed at the end of the gathering station slider bed, may be employed by attaching its cable to the front end of the container after its cable 67 is trained about pulley 59. The container 10 will then await the arrival of a train including cars such as cars 16 that carry one or more turntable structures 30. The cars 16 are positioned alongside the gathering station 20 somewhat as indicated in FIGURE 16 and an empty turntable structure is turned 90 degrees in any suitable manner, as by attaching thereto the cable 67 of which 66 of the nearest loader slider bed, after it has been pulled between the slider bed pulleys 58, to position same for receiving a container 10 from the gathering station. The said nearest slider bed structure 24 is moved along beams 32 into exact alignment with the empty turntable structure by employing a device such as winch 60 and cable 62, the slider bed being secured to cable 62 in a manner such as that suggested by FIGURE 17. The trackside of gathering station 20 is formed with a continuous abutment 64 (see FIGURES 18 and 21) that is elevated sufficiently to support, against sag the ends of gathering station slider beds 24 that project toward the track, as well as the outwardly extending end of the said aligned turntable structure slider bed. Latch bars 42 may be applied in the same manner as described above to hold the thus positioned gathering station and turntable slider beds in alignment (see FIGURE 18). The container 10 may then be transferred to the turntable structure by employing winch 66 to slide the container onto the railroad car in the manner diagrammatically illustrated in FIGURE 11.

The turntable structure 30 and the container are locked in position as described above for further transportation after which the container may be unloaded at a further gathering station 20 by reversing the procedure described above, winches 66 being used to draw the containers off the cars when a vehicle 14 and 14a is not available for this purpose.

The winches of vehicles 14 or 14a may be used to move the containers entirely across the slider beds 24 of the station 20 when moving the containers between the railroad and highway vehicles, if so desired.

At this point in the description, it will be immediately apparent that it is not necessary to lift the container 10 at any point during its handling, it merely being slid from one slider bed to another. Also, the slider beds of the various stations, platforms and vehicles are all generally identical in design and are in fact readily interchangeable so that containers designed in accordance with the principles of my invention will be readily adapted for support at any point in its travels.

Another thing that should be immediately apparent is that the structural elements making up the various components of the system are readily applied to existing facilities. For instance, railroad car 16 may be any conventional type of flatcar, while the highway vehicle may be any conventional model that includes a chassis on which guideways 26 may be mounted. The containers may be any of the sizes or shapes suggested by FIGURES 1, 5, 16, 19, 22 and 23, as well as many others.

The Slider Beds and Container Beams

The guideways 26 of each slider bed 24 are formed by spaced vertically disposed channels 70 which are fixed in any suitable manner to a horizontally disposed channel 72 that fixedly carries along its web a slide bar 74 formed with a plurality of upwardly projecting convexly rounded protuberances 76. The protuberances 76 may be any form of spaced bead welds formed at random along the bar 74. The channels 70 and 72 and bars 74 may be secured together as by welding or in any other suitable manner.

The convex surfaces of the protuberances 76 insure that there is a minimum of contact between the slider beds and the beams 22 of the containers, which materially reduces the friction between the slider beds and the containers. I contemplate that an appropriate type of lubricant may be applied to the plate 74 if so desired. Preferably, a sufficient number of protuberances 76 are provided to keep the individual stresses applied to them well below that resulting in fracture.

The guideways 26 of platforms 12 may be fixed to the platform in any suitable manner, somewhat as indicated diagrammatically in FIGURES 19 and 20, wherein plates 77 securing the guideways in spaced relation are secured to the platform 12 by appropriate bolts 79.

The guideways 26 of the chassis may be fixed as by welding to spaced brace plates 80 (see FIGURE 6) that are secured between the framing members 82 of the chassis; this may be done on both the truck or trailer chassis. The slider bed of the highway vehicle includes a pair of spaced pulleys 52, which, as indicated in FIGURE 10, are mounted to either side of the longitudinal center of the vehicle between spaced plates 84 that are welded between the inner channels 70. The outer channels 70 of the highway vehicle slider bed at the rear end of the vehicle are provided with several U-shaped brackets 86, which may be fixed in place in any suitable manner, as by welding, for receiving the latch bars 42.

The guideways of the slider beds of the turntable structures 30 are fixed in any suitable manner to upper turntable element 90, as by welding, and support between them at each end of the turntable structure a pulley 50 positioned at one side or the other of the longitudinal center of the slider bed and journalled between spaced bars 92 that are generally similar to bars 84. The outer channels 70 of the turntable structure slider beds are provided with the U-shaped brackets 86 at each end of the slider bed for receiving latch bars 42.

The slider beds of the gathering station 20 include the guideways 26 fixed to each other in pairs by appropriate plates 96. The slider beds of the gathering station 20 include pulleys 58 at the railroad vehicle side of the station, and pulley 59 at the highway vehicle side which are respectively journalled between plates 97 and 99 that are similar to plates 84 and 92.

The beams 22 may be of any suitable type; in the form illustrated in most of the drawing figures, they are conventional I-beams that include bases 100 proportioned to ride on the protuberances 76 of the guideways 26. Preferably, the ends of the beams are rounded as at 101 to guide the entry of the beams into the respective guideways.

The slider bed 103 of FIGURE 13 may be used on the highway vehicle chassis as the latter do not require vertical movement stops. In the embodiment of FIGURE 13, the guideways 105 are defined by elongate beams 107 of U-cross section, protuberances 76 being applied directly to webs 109 of the latter.

The Containers

The containers may assume any suitable construction that will provide the structural characteristics for transporting freight over long distances and may in fact be in the form of a conventional truck or trailer body. As the container will not be lifted at any point during its use in my system, no special design is required, it only being necessary that the container be sufficiently sturdy to withstand normal handling. Brackets 46 may be applied to the bottom of each container about six inches from each end thereof. Preferably the container is of the type that can be sealed at the point of departure, though it may be any open body type 111 adapted for carrying the type of freight ordinarily carried in a gondola type of freight car (see FIGURES 16 and 22).

Though no doors are shown in the containers as illustrated, it should be obvious that they may be of any conventional type, and may be located at either the sides or ends of the container. The bodies can be of random lengths so that two or more may be loaded on the same slider bed 24 (see where indicated at 10a, 10b and 10c of FIGURE 16). The container 113 of FIGURE 23 is a conventional pickup truck body provided with beams 22 so that it may be used as described above or removed from the chassis for transporting one of the other containers, as by being transferred to a slider bed 24 maintained for this purpose at the trucker's garage.

The Highway Vehicle

The highway vehicle employed may be of any suitable type that includes a chassis designed to support a slider bed structure 24. The chassis 110 of FIGURE 6 is a trailer chassis that is suitable for this purpose while the chassis 28 of FIGURE 1 is a conventional truck chassis. The winch 36 may be of any suitable type that is mounted at the forward end of the slider bed and journalled in any suitable manner for rotation under the action of suitable power applying means, such as the hand levers 112 shown in FIGURES 1 and 6. Alternately, suitable power actuated motivating means may be employed to turn winches 36. The adjustable props 40 may be of any appropriate type; as illustrated (see FIGURE 2), they comprise upper and lower telescoping members 120 and 122 held in adjustable relation by a suitable bolt 124. The upper members 120 are pivoted to the rear end of the chassis frame as at 126. Adjustable props 40 may be held in inoperative position in any suitable manner, as by being secured between bars 127, depending from chassis 28 or 110, by bolt 129. The props employed may also be provided in the form of screw jacks where some adjustment in height is required.

The channels 70 of the vehicle slider bed are perforated as at 130 to receive appropriate bolts 48 that also pass through perforations 132 formed in the beams 22 of the container. Bolts 48 include appropriate securing nuts, lock washers and the like. The cable 38 is positioned above plates 84 when applied to the container as shown in FIGURE 11.

Highway vehicle chassis equipped with a slide bed structure 24 may carry any type of container employing beams 22, and if desired, several containers at one time if the latter are sufficiently short in length. This also applies to railroad cars 16.

The Railroad Car

As mentioned above, the railroad car 16 may be of any suitable type, the conventional flatcar perhaps being best suited for the purposes of my invention. As indicated in FIGURE 1, the car 16 includes conventional bed 140 mounted in the usual manner on flanged wheels 142 which ride on track rails 144. The bed 140 supports one or more turntable structures 30 (depending upon the size of the container 10 to be carried by the car), each of which includes a slider bed 24. The turntable structures also include a headed pin or post 146 (see FIGURES 3, 7, 14 and 15) fixed in any suitable manner to the bed 140 and which serves as the center pivot of the turntable. The turntable structure further comprises the upper ring-shaped plate 90 which is fixed to the bed 24, as by welding, and which rides on lower ring-shaped plate 148 that is fixed in any suitable manner to the bed 140.

The slider bed structure of the railroad car preferably includes a cushioning device, such as that indicated at 149, interposed between it and pin or post 146. The device 149 illustrated comprises a bottom plate 150 fixed to car bed 140 in any suitable manner, a top plate 151 secured between the guideways 26 and provided with a relatively large opening 153 through which pin or post 146 protrudes, and a pair of outer vertically disposed plates 154 fixed between guideways 26 as by welding, the plate 151 being removably secured to plates 154 by appropriate bolts. Compression springs 155 are interposed between each plate 154 and a sliding plate 156 that bears against the post 146, while compression springs 157 are interposed between plates 158 that are fixed to the guideway 26 and sliding plates 159. The springs 155 and 157 are received about suitable seats (not shown) and the movement of plates 156 and 159 is guided in any suitable manner, as by proportioning these plates so that their ends ride against adjacent plates. Pin or post 146 includes the head 152 that is proportioned to overlie opening 153 and the adjacent portion of plate 151, head 152 preferably being removably mounted as by bolts 161.

The plates 150 and 151 hold springs 155 and 157 in place as they perform their functions. Springs 155 absorb shock longitudinally of the slider bed during transit of the railroad car 16. Both springs 155 and 157 center the turntable structure about post 146.

The device 149 is illustrated for descriptive purposes only, as any suitable cushioning mechanism may be employed to cushion the shearing action of loads carried by the turntable structure 30 on pin or post 146.

The guideways 26 of the turntable structure 30 at each end are positioned between angle brackets 56 and carry U-shaped brackets 86 as mentioned above and shown in FIGURE 7. Angle brackets 56 are formed with appropriate bolt holes 160 to receive bolts that fix the turntable against swinging movement with respect to the car bed 140. Channels 70 of the turntable structure beds are formed with appropriate perforations 162 that receive bolts 54 for securing the container in place against sliding movement on the turntable structures.

Each turntable structure at each side thereof includes a laterally extending framework 164 (see FIGURE 7) that carries the line up bars 166 which are employed by the operator of the highway vehicle to line his vehicle up with the slider bed of the railroad car. The frameworks 164 may be of any appropriate type, and, as illustrated, comprise a pair of spaced channels 168 fixed in any suitable manner to the outer channels 70 and having their outwardly extending ends secured together by an appropriate plate 170. As indicated in FIGURE 8, each bar 166 comprises an elongate member pivoted at one of its ends to plate 170 as by an appropriate pin 172. Each bar 166 may be provided with an appropriate device for holding same in upright position during use, pivotally mounted hook 174 that fits over the top of the adjacent channels 168 being shown in the illustrated embodiment. The bars 166 are pivoted to a horizontal position when not in use, they being held in inoperative position by appropriate lugs 176 in the illustrated embodiment (see FIGURE 7).

In use, the line up bars are raised after the turntable structure has been approximately positioned for the container transfer operation and to align the two bars 166 on his side, the operator sights rearwardly of his cab to finish aligning the container carrying chassis with the turntable slider bed.

After the turntable structures 30 have been secured to the railroad car bed 140 against any rotating action, appropriate tie-down devices may be secured between the bed 140 and the customer's of the container where indicated at 180 in FIGURE 1.

The Gathering Stations

As diagrammatically illustrated in FIGURES 16, 18 and 21, the slider beds 24 of the gathering station are mounted on an appropriate platform 190 that is provided with a generally horizontal surface 192 on which beams 32 are secured in any suitable manner. In the embodiment illustrated, beams 32 are in the form of channels 194, the slider beds 24 carrying V-shaped brackets 196 that ride in the channels (see FIGURE 18). The abutment 64 is formed in any suitable manner along the side of platform 190 that faces the railroad track 144 on which railroad cars 16 ride and includes a horizontal top surface 197 elevationally disposed to support the ends of the gathering station slider beds that project toward the track as well as the ends of the railroad turntable slider beds that may be positioned for cooperation therewith (see FIGURE 18).

The beds 24 of the gathering station are preferably individually movable longitudinally of the track, as by employing winch 60 (see FIGURE 16) that may be turned by appropriate handle 198 or a suitable power unit to move cable 62. Cable 62 has both ends secured to the winch and is trained about appropriate pulley 200 at the far end of the station. This provides two cable lengths 202 and 204 which move either to the right or to the left of FIGURE 16 depending upon which direction the winch 60 is turned. Each bed 24 at its center portion is provided with a cable connecting device such as that diagrammactially illustrated in FIGURE 17 at 206, which may include a short cable 208 carrying an appropriate hook 210 at one end thereof and secured to one of the guideways at the other end thereof as by an appropriate bracket 212. The cable 62 extends under the beds 24 and when it is desired to move one of the beds 24 to align it with a turntable structure slider bed that has been turned at an angle of 90 degrees with respect to the railroad car, the hook 210 is engaged with either cable length 202 or 204 as indicated in FIGURE 17, and the winch 60 turned in the appropriate direction to move the cable length and consequently the slider bed in the direction and to the position desired.

Each of the slider beds 24 of the gathering station is provided with a device 206 or its equivalent so that the slider beds are individually movable. Winches 66 may be operated by appropriate motors 207, or in any other suitable manner.

*The Loading and Unloading Platforms*

The loading and unloading platforms 12 (see FIGURES 19 and 20) may be of any suitable structure provided with a generally horizontal top surface 220 on which the slider beds of the platform 12 are mounted. The slider beds include guideways 26 constructed in a manner similar to that described above, they including channels 70 and 72, slider bar 74 with its protuberances 76, and a pulley 50 at the outwardly extending end of the bed. The channels 70 of the platform 12 may be formed with perforations 221 similar to perforations 130 or 162 of FIGURES 2 and 7 for receiving appropriate bolts that lock the containers in position on the loading and unloading platform. The platform 12 may be constructed adjacent the customer's plant 222 for ready access to the containers.

*Advantages of the Invention*

It should now be immediately apparent that my system of handling freight permits freight movement to be made to and from any destination with the minimum of delay, without the necessity of tieing up expensive highway vehicle equipment during the trip or during the loading and unloading time at the customer's plant or other place of business. No lifting of the container body whatsoever is required, which eliminates the need for expensive cranes, lift trucks or other types of hoists. The container bodies ride flat on the railroad cars, and since they rest directly on the car bed, they offer minimum resistance to wind and insure that the center of gravity of the car and its load will be well below that of the conventional piggyback systems. Since the height of the load is also kept down by the container resting directly on the car bed, the same freedom of movement is insured for trains containing cars 14 as would be for a train made up of ordinary box cars. This is particularly important when one considers the amount of track mileage that must contend with mountains, tunnels, low bridges and the like.

My system eliminates the possibility of loss and theft now frequently happening by providing for loading the freight into sealed containers which remain sealed port to port. Since the transfer of freight from one container to another at transfer points is avoided, the opportunity for loss and theft is obviated.

Loads may be packed in the containers of my system that are of a size proportioned to hold only the load to be packed, and such containers sealed for shipment. Moreover, a single large container may be packed and sealed for shipment to several stops, the several loads being unloaded and the container sent on to its ultimate destination at the other end of the line.

The containers may be loaded at a shipper's platform where there is a siding and then transferred directly to a railroad car, which eliminates trucking until the destination of the railroad car is reached.

An important advantage of my system is the interchangeability of the different components and their dependability for use at any installation. The slider beds are essentially standardized in form and any slider bed 24 may be applied to either a loading or unloading platform 12, a highway vehicle chassis 14, a railroad car 16, or a gathering station 18 with only minor modifications. The slider beds will carry large and small containers, provided the beams 22 employed are positioned in conformity to guideways 26. In accordance with my system, any railroad siding is available for the loading or unloading of a flatcar that is equipped with a turntable structure 30 carrying a freight container 10. In the case of towns or plants having no railroad siding or where deliveries are to be made by truck, the container can be picked up at the nearest siding and deliveries made as required. In the case of a town that would have very few truck deliveries, the local trucker can have one of his trucks so built that the body which he normally uses includes beams 22 which cooperate with a slider bed 24 mounted on his truck chassis. He would then remove his own truck body when the need arises and pick up a loaded freight container at, for instance, the nearest railroad siding, and make delivery to a destination or delivery point. The container body can be then unloaded and returned to the flatcar, and the truck body restored to the chassis.

Where a transfer point on a railroad is reached, the delay of sending the freight through the yards on a belt line is eliminated by moving the container by truck from arriving freight to outgoing freight with minimum cost.

Some approximate measurements of a proven embodiment of the invention are as follows: the channels 70 and 72 of the slider bed guideways are 20 feet long, and the guideways are placed on centers 32 inches apart. The guideways will accommodate container bodies of any length up to the maximum permitted by law.

The guide bars 166 of the turntable structures are placed 4½ feet on either side of the centerline of the turntable slider bed, and the containers are proportioned so that they will fit between the guide bars on either side of the turntable when the container is moved onto the turntable slider bed. The slider bed of the highway vehicle is applied to the chassis in such a manner that the bottoms of the channels 70 will be approximated 4 feet above the ground. Suitable ramping, such as boards or planks, may be provided at platforms 12 and stations 20 as well as at the railroad track for insuring that the slider bed of the highway vehicle lines up with the slider bed that is to receive a container, or from which a container is to be removed.

The term "container" as used in the appended claims is intended to mean conventional truck or trailer bodies, as well as all others suitable for the purposes of my invention.

The term "cable" as used in the appended claims is intended to mean rope and other elongated strand-like members suitable for the purpose of drawing the containers over the slider beds.

The foregoing description and the drawings are given merely to explain and illustrate my invention and the invention is not to be limited thereto except insofar as the appended claims are so limited, since those skilled in the art who have my disclosure before them will be able to make modifications and variations therein without departing from the scope of the invention.

I claim:

1. Apparatus for handling freight containers comprising a track for railroad cars, a freight container gathering station comprising a plurality of slider beds positioned along said track and extending transversely thereof, means for mounting said slider beds for sliding movement independently of each other longitudinally of said track, a railroad car carrying a turntable, a slider bed mounted on said turntable, a container having skid beams secured to the bottom thereof for sliding engagement with said slider beds, means for selectively moving said gathering station slider beds longitudinally of the track and independently of each other to align one of the latter with said slider bed of said railroad car when the car is positioned on said track alongside said station, and means for sliding the container between said one slider bed of said gathering station and said slider bed of said railroad car.

2. The apparatus set forth in claim 1 wherein said gathering station includes continuous abutment means extending longitudinally of said track and between said track and said slider beds of said station, said abutment means being positioned and proportioned to support the aligned ends of said one station slider bed and said railroad car slider bed when the latter is aligned with said one station slider bed.

3. Apparatus for transporting freight comprising a railroad car carrying a turntable, and a slider bed secured to said turntable for receiving a demountable container, said slider bed comprising a pair of guideways, said turntable carrying a pair of elongate rectilinear sighting elements on one side of said slider bed each mounted for movement between an upright, extended position and a lowered retracted position, said elements being spaced equal distances laterally of said slider bed and being spaced from the longitudinal center line of said slider bed a distance that exceeds one half of the width of the container, whereby, when said elements are extended to their upright positions and said turntable has been positioned to dispose said slider bed crosswise of the railroad car, the operator of a rear discharge highway vehicle carrying the container may line the container up with said slider bed, for purposes of discharging the container onto said railroad car slider bed, by visually lining up said elements.

4. Apparatus for handling freight comprising a freight container, a railroad track for railroad cars, a highway vehicle chassis carrying a slider bed extending longitudinally thereof, a railroad car carrying a turntable, a slider bed mounted on said turntable, means for releasably securing said turntable against rotational movement when the slider bed carried thereby is positioned longitudinally of the railroad car, a freight container gathering station adjacent said track and comprising a platform defining a railroad car loading side extending adjacent to and longitudinally of the track and a highway vehicle loading side opposite to and extending generally parallel to said railroad car loading side, a plurality of slider beds mounted on said platform, said slider beds each comprising a plurality of parallel elongate rigid members each defining an upwardly facing rectilinear guideway, said members being substantially horizontally disposed, and brace members rigidly securing the guideways of the respective slider beds in spaced relation, said guideways of the respective slider beds having a uniform spacing, said container having secured to the bottom thereof a plurality of skid beams corresponding in number and spacing to said guideways of said slider beds, said platfrom slider beds extending transversely of said track and between said sides of said platform, a trackway carried by said platform and extending parallel to said track and longitudinally of said platform, said platform slider beds being slidably mounted on said trackway, means for selectively moving the individual platform slider beds longitudinally of said trackway to individually align same with said railroad car or with said chassis when the latter are positioned adjacent the respective sides of said platform, said railroad car loading side of said platform including a continuous abutment extending longitudinally thereof on which the adjacent ends of said platform slider bed guideways rest, said rigid members of the respective slider bed guideways being proportioned in length to permit the guideway ends of the chassis and turntable slider beds to be placed in contiguous relation to the guideway ends of the respective platform guideways, latch bar means for latching together in longitudinal alignment the respective ends of the platform slider bed guideways with like ends of the respective railroad car and highway vehicle chassis slider beds when the latter are placed in contiguous relation thereto, and winch and cable means carried by said highway vehicle chassis and said platform for moving said container between and onto the respective slider beds.

5. The apparatus set forth in claim 4 wherein said rigid members of said slider beds that define the respective guideways each comprise a slide element provided with a plurality of convexly rounded upwardly extending protrusions of substantially uniform size.

6. The apparatus set forth in claim 4 wherein cushioning means is interposed between said turntable and said railroad car, whereby buff and draft forces applied to the railroad car are absorbed by said cushioning means.

References Cited in the file of this patent

UNITED STATES PATENTS

| | | |
|---|---|---|
| 454,306 | Tobey | June 16, 1891 |
| 1,237,834 | Stamper | Aug. 21, 1917 |
| 1,271,812 | Wagner | July 9, 1918 |
| 1,541,457 | Winn | June 9, 1925 |
| 1,552,644 | Perin | Sept. 8, 1925 |
| 1,611,882 | Budd | Dec. 28, 1926 |
| 1,685,035 | Robertson | Sept. 18, 1928 |
| 1,783,363 | Grob | Dec. 2, 1930 |
| 1,835,133 | Bergen | Dec. 8, 1931 |
| 1,993,481 | Kellett | Mar. 5, 1935 |
| 2,000,823 | Clover | May 7, 1935 |
| 2,004,095 | Hankins et al. | June 11, 1935 |
| 2,126,763 | Fitch | Aug. 16, 1938 |
| 2,352,129 | Shonnard | June 20, 1944 |
| 2,416,071 | Shonnard | Feb. 18, 1947 |
| 2,447,559 | Bloemers | Aug. 24, 1948 |
| 2,543,295 | McGregor et al. | Feb. 27, 1951 |
| 2,691,449 | Claybourn | Oct. 12, 1954 |
| 2,691,450 | Rosenbaum | Oct. 12, 1954 |
| 2,714,967 | Olsen | Aug. 9, 1955 |
| 2,821,936 | Weissmann | Feb. 4, 1958 |
| 2,828,027 | Stevenson et al. | Mar. 25, 1958 |
| 2,856,085 | Ryan | Oct. 14, 1958 |

FOREIGN PATENTS

| | | |
|---|---|---|
| 24,163 of 1929 | Australia | Nov. 18, 1930 |